Patented Feb. 14, 1950

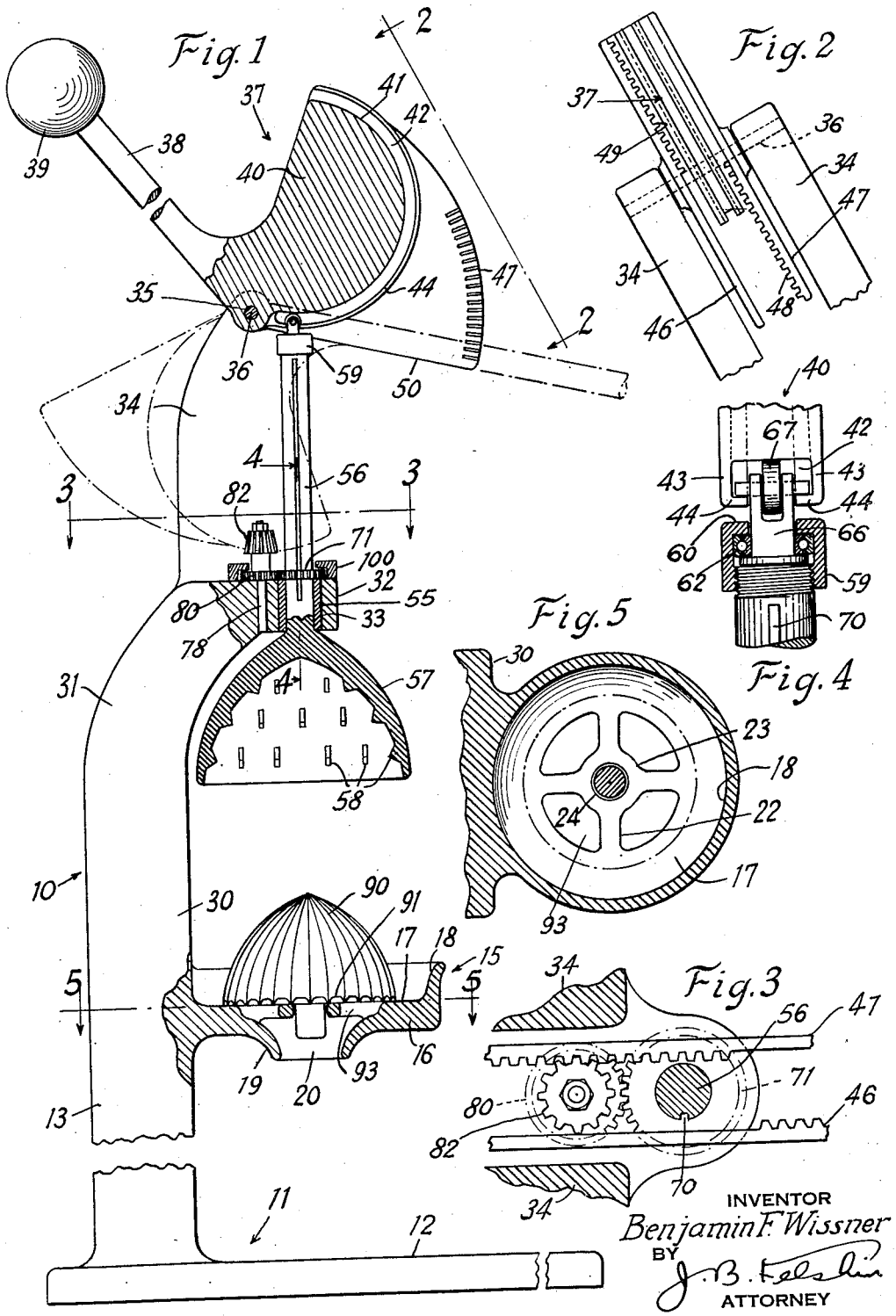

2,497,335

UNITED STATES PATENT OFFICE 2,497,335

CITRUS FRUIT SQUEEZER WITH ROTATING AND RECIPROCATING CUP

Benjamin F. Wissner, New York, N. Y.

Application July 24, 1944, Serial No. 546,326

11 Claims. (Cl. 146—3)

This invention relates to citrus fruit squeezer.

An object of this invention is to provide a squeezer of the character described comprising a stand supporting a ribbed cone or reamer, and a cup above the cone, and means to move the cup towards the cone and rotate the cup first in one and then in an opposite direction.

A further object of this invention is to provide a squeezer of the character described having means to depress the cup down toward the cone and rotate the cone successively in opposite directions as a handle is moved by the operator in one direction, the construction being such that the cup will begin to rotate at about the time the piece of fruit therein strikes the cone, and the cup continues to move toward the cone as the cup rotates.

A further object of this invention is to provide a strong, compact and durable squeezer of the character described, which shall be relatively inexpensive to manufacture, easy to operate, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawing, in which is shown one of the various possible illustrative embodiments of this invention, Fig. 1 is an elevational view of a squeezer embodying the invention with parts broken away and in cross-section, and showing the operating handle and cam in dotted lines in the position where the cone is substantially fully depressed;

Fig. 2 is a view taken on line 2—2 of Fig. 1;

Fig. 3 is a cross-sectional view taken on line 3—3 of Fig. 1;

Fig. 4 is an enlarged, sectional view taken on line 4—4 of Fig. 1; and

Fig. 5 is a cross-sectional view taken on line 5—5 of Fig. 1.

Referring now in detail to the drawing, 10 designates a juicer for citrus fruit embodying the invention. The same comprises a stand 11, shown in Fig. 1 of the drawing, provided with a horizontal base 12. Extending upwardly from the base 12 is a vertical shank 13. Extending from shank 13 is a horizontal shelf 15 disposed above the base 12 a sufficient distance to permit placing a glass below said shelf.

Shelf 15 comprises an annular portion 16 having a flat horizontal surface 17. Extending upwardly from wall 16 is an annular outwardly flaring wall 18. Extending downwardly and inwardly from wall 16 is a nozzle 19 formed with a central opening 20. Integrally formed with the nozzle is a spider 22 interconnected by a central ring 23 formed with an axial opening 24 for the purpose hereinafter appearing.

Extending inwardly from stand portion 13 and above shelf 15 is a stand portion 30 having an upwardly curved portion 31. At the upper end of the curved portion 31 is a horizontal wall 32 disposed above the center of shelf 15. Wall 32 is formed with a vertical through opening 33 aligned with opening 24 for the purpose hereinafter appearing. Extending upwardly from wall 32 are a pair of parallel spaced similar walls 34 formed with aligned openings 35 at their upper ends, carrying a transverse pin 36.

Pivoted on pin 36 is an actuator 37. The actuator 37 comprises a radial handle 38 provided with a ball 39 at its outer end. Said member 37 furthermore comprises a wall 40 having a cam surface 41. Cam surface 41 starts adjacent the pivot pin 36 and is curved as shown in Fig. 1 of the drawing. It will be noted that the curve of cam 41 is such that the increments of radial distance from the pivot axis 36 decreases per unit angle of rotation from the starting point. Cam surface 41 is in the form of a groove 42 at the edge of plate 40 forming side walls 43. At the edge of side walls 43 are inwardly extending flanges 44 as illustrated in Fig. 4 of the drawing. At the sides of member 40 are a pair of parallel plates 46, 47 having arcual outer edges. Plate 47 is formed on the inner surface thereof with bevel gear teeth 48 extending substantially half the angle of the arc; and plate 46 is formed with bevel gear teeth 49, on the inner surface thereof, extending the other half of the arc. Thus the gear teeth 49 begin after the gear teeth 48 end, as shown in Fig. 2 of the drawing.

Furthermore, the leading edges 50 of plates 46, 47 are cut back so that the handle 38 must be moved through a considerable angle before such leading edges 50 reach a substantially vertical position.

Within opening 33 is a bushing 55. Extending through the bushing is a rod or stem 56 provided at its lower end with a cup 57 disposed below wall 32. Cup 57 is formed with cleats or prongs on its inner surface to grip a half piece of citrus fruit. Screwed to the upper end of stem 56 is a sleeve 59 formed with an inwardly extending flange 60 at its upper end. Within sleeve 59 is a ball bearing 62. The outer race of the ball bearing is fixed to sleeve 59. Attached to the inner race of the ball bearing is a rod 66 bifurcated at its upper end and projecting through sleeve 59 and into groove 42, and carrying a roller 67 contacting the cam surface.

Member 66 may be formed with flat side walls adapted to engage the inner edges of flange 44 to prevent rotation of said member about its axis, whereby to maintain the roller 67 in proper rolling relation relative to cam surface 41.

Stem 56 is formed with a longitudinal slot 70. On said stem and contacting the upper end of bushing 55 is a pinion 71 splined to stem 56. On wall 32 is a vertical shaft 78 parallel to the bushing 55 and disposed adjacent thereto and extending above the upper surface of wall 32. On shaft 78 is a pinion 80 meshing with pinion 71. Fixed to pinion 80 and disposed thereabove, is a bevel gear 82 adapted to first be engaged by gear 48, as handle 38 is rotated in a clockwise direction, and thereafter to be rotated by gear 49.

Any suitable bracket 100 may be attached to the horizontal wall 32 to retain pinions 71 and 80 on said horizontal wall.

It will be noted that as handle 38 is rotated from full to dotted line positions shown in Fig. 1, stem 56 and hence cup 57 will be moved downwardly at a gradually decreasing rate due to action of cam 41 on roller 67. When the cup descends to a point where the gear 48 engages gear 82, the cup will first be rotated in one direction, as it continues to descend, and thereafter said cup will be rotated in an opposite direction by gear 49, as the cup continues to descend.

Mounted on surface 17 of wall 16 is a ribbed cone or reamer 90 formed at the bottom with flutes 91. Reamer 91 is formed with a stem fitting in hole 20. If it is desired to squeeze half an orange, the same is held over the reamer, the handle is then rotated and the cup comes down. As it engages the half of orange, the prongs 58 engage the orange and at first the orange is pressed downwardly. As it begins to press against the reamer, the cup begins to rotate first in one direction and then in an opposite direction as the cup descends, so that substantially all of the juice is squeezed out of the orange and passes through the flutes or openings 91 in the base of the reamer, through openings 93 in the nozzle, and out through opening 29 to a glass placed on the base 12.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. A squeezer comprising a stand, a reamer on the stand, a cup formed with a stem, a cam engaging the upper end of the stem for depressing the same, and means on the cam operable upon moving the cam in one direction for rotating said stem in one direction as the stem is moved by said cam, means for causing rotation of said stem in an opposite direction as said stem is continued to be moved by said cam, and means on the cam and operable upon moving the cam in an opposite direction to lift the stem.

2. A juicer comprising a stand, a reamer on the stand, a vertical stem, a cup at the lower end of the vertical stem, means on the stand to support said stem for rotation as well as sliding movement, a pinion on the stand splined to said stem, a second pinion journalled in the stand and meshing with the first pinion, a gear rotatable with the second pinion, a cam pivoted to the stand, a handle for rotating said cam, means at the upper end of the stem engaging said cam, an arcual gear attached to said cam for rotation thereof, and adapted to engage said first gear, and a second arcual gear adapted to mesh with said first gear after the first gear releases from said first-mentioned arcual gear.

3. A juicer comprising a stand having a base, a portion extending upwardly from the base, a shelf on said portion above the base, a reamer on said shelf, said stand having a portion extending above the shelf and formed with a horizontal wall disposed above said shelf, said horizontal wall being formed with an opening aligned with the axis of the reamer, said stand further being formed with a pair of parallel walls extending above said horizontal wall and forming a slot therebetween, a cam pivoted to the upper end of said parallel walls and disposed between said parallel walls, a handle on said cam for rotating the latter, a bushing within said opening in said horizonal wall, a stem passing through said bushing, a cup at the lower end of said stem disposed below said horizontal wall and above said reamer, and a member rotatably mounted at the upper end of said stem and provided with a roller engaging said cam to depress said stem upon rotating said cam in one direction, said cam having means engaging beneath the roller to lift the stem upon moving said cam in an opposite direction.

4. A juicer comprising a stand having a base, a portion extending upwardly from the base, a shelf on said portion above the base, a reamer on said shelf, said stand having a portion extending above the shelf and formed with a horizontal wall disposed above said shelf, said horizontal wall being formed with an opening aligned with the axis of the reamer, said stand further being formed with a pair of parallel walls extending above said horizontal wall and forming a slot therebetween, a cam pivoted to the upper end of said parallel walls and disposed between said parallel walls, a handle on said cam for rotating the latter, a bushing within said opening in said horizontal wall, a stem passing through said bushing, a cup at the lower end of said stem disposed below said horizontal wall and above said reamer, a member rotatably mounted at the upper end of said stem and provided with a roller engaging said cam, and guide means on said cam to confine said roller.

5. A juicer comprising a stand having a base, a portion extending upwardly from the base, a shelf on said portion above the base, a reamer on said shelf, said stand having a portion extending above the shelf and formed with a horizontal wall disposed above said shelf, said horizontal wall being formed with an opening aligned with the axis of the reamer, said stand further being formed with a pair of parallel walls extending above said horizontal wall and forming a slot therebetween, a cam pivoted to the upper end of said parallel walls and disposed between said parallel walls, a handle on said cam for rotating the latter, a bushing within said opening in said horizontal wall, a stem passing through said bushing, a cup at the lower end of said stem disposed below said horizontal wall and above said reamer, a member rotatably mounted at the upper end of said stem and provided with a roller engaging said cam, a pinion splined to the stem, a second pinion rotatably mounted on said horizontal wall and meshing with the first pinion, a bevel gear fixed to the second pinion for rotation therewith, and gear means on the cam to successively engage opposite sides of the bevel gear for alternately rotating said cup as the cam depresses said cup upon rotating of said handle.

6. A citrus fruit squeezer comprising a stand, a reamer on the stand, a cup mounted for sliding movement on the stand downwardly toward the reamer and upwardly away from the reamer, said cup also being mounted on the stand for rotation about its axis, a handle mounted for oscillation up and down on said stand, means operable upon the downstroke of the handle for causing sliding movement of the cup without rotation, means associated with the first means for causing rotation of the cup in one direction during an intermediate portion of the downward sliding movement of the cup, and other means associated with the first means for causing rotation of the cup in an opposite direction during a final portion of the sliding movement of the cup downwardly toward the reamer, and means to raise the cup upon the upstroke of the handle.

7. A juicer comprising a stand, a reamer supported on a stand, a cup, a stem extending upwardly from the cup, means on the stand and engaging the stem for supporting the cup for longitudinal as well as rotary movement relative to the axis of the stem, a handle pivoted to the stand and adapted to be oscillated in opposite directions, a cam carried by said handle and engaged with said stem to impart longitudinal movement to the stem during oscillation of the handle, means operative upon one stroke of the handle for rotating the cup one or more revolutions in one direction during an intermediate part of the downstroke of said handle, means to rotate the cup one or more revolutions in an opposite direction during completion of the downstroke of the handle, and means for raising the cup upon the upstroke of the handle.

8. A juicer comprising a stand, a reamer supported on the stand, an inverted cup above the reamer and coaxial therewith, means for supporting the cup for movement toward and away from the reamer and for rotation about its axis, a lever pivoted to the stand, a member operable upon one stroke of the lever to move the cup from its position remote from the reamer toward the reamer, the total length of movement of the cup without turning the cup, a member moving with said member for rotating the cup in one direction during an intermediate portion of the said stroke of the lever, and another member associated with the first member for rotating the cup in an opposite direction following rotation of the cup in the first direction.

9. A fruit juicer comprising a stand, a reamer on the stand, an inverted cup above the reamer, means on the stand for mounting the cup for movement up and down, towards and away from the reamer and for rotation about its axis, a lever pivoted to the stand and means operable upon the down stroke of the lever only, to slideably move the cup down from its initial position remote to the reamer at least half of the total downward movement of the cup without turning the cup, means operable during an intermediate portion of said stroke of said lever to rotate the cup at least one revolution as the cup approaches the reamer, means operable during the final period of the said downward stroke of the lever to rotate the cup in an opposite direction, and means operable upon the up stroke only of the lever for moving the cup back to initial position.

10. A juicer comprising a stand, a reamer on said stand, a cup rotatably and slidably mounted on the stand and aligned with the reamer, gearing associated with said cup, a handle, a cam operative upon movement of the handle in one direction to move the cup towards the reamer without rotation, a rack carried by said cam for engaging the gearing to rotate the cup in one direction during an intermediate portion of the movement of the cup towards the reamer, and another rack carried by the cam to engage the gearing and rotate the cup in an opposite direction as the cup continues its movement towards the reamer, and means to raise the cup during movement of the handle in an opposite direction.

11. A juicer comprising a stand, a reamer supported on the stand, an inverted cup above the reamer and coaxial therewith means for supporting the cup for movement toward and away from the reamer and for rotation about its axis, a lever pivoted to the stand, means operable upon one stroke of the lever to move the cup from its position remote from the reamer toward the reamer, a substantial portion of the total length of movement of the cup and into position for engaging the fruit without turning the cup, means for rotating the cup, and means operatively connecting the lever and said last mentioned means to rotate the cup at least one revolution during continued movement of the cup longitudinally toward the reamer.

BENJAMIN F. WISSNER.

REFERENCES CITED

The following references are of record in the file of this patent:

UNITED STATES PATENTS

| Number | Name | Date |
| --- | --- | --- |
| 236,410 | Bentzen | Jan. 11, 1881 |
| 399,229 | Scott | Mar. 5, 1889 |
| 530,268 | Hensel | Dec. 4, 1894 |
| 587,390 | Edwards | Aug. 3, 1897 |
| 968,345 | Hackney | Aug. 23, 1910 |
| 1,115,754 | Walker | Nov. 3, 1914 |
| 2,160,523 | Scurlock | May 30, 1939 |